Oct. 19, 1954

J. F. BLACKBURN 2,691,895

DRIVE MECHANISM

Filed May 27, 1947

3 Sheets-Sheet 1

INVENTOR
JOHN F. BLACKBURN

BY

ATTORNEY

INVENTOR
JOHN F. BLACKBURN

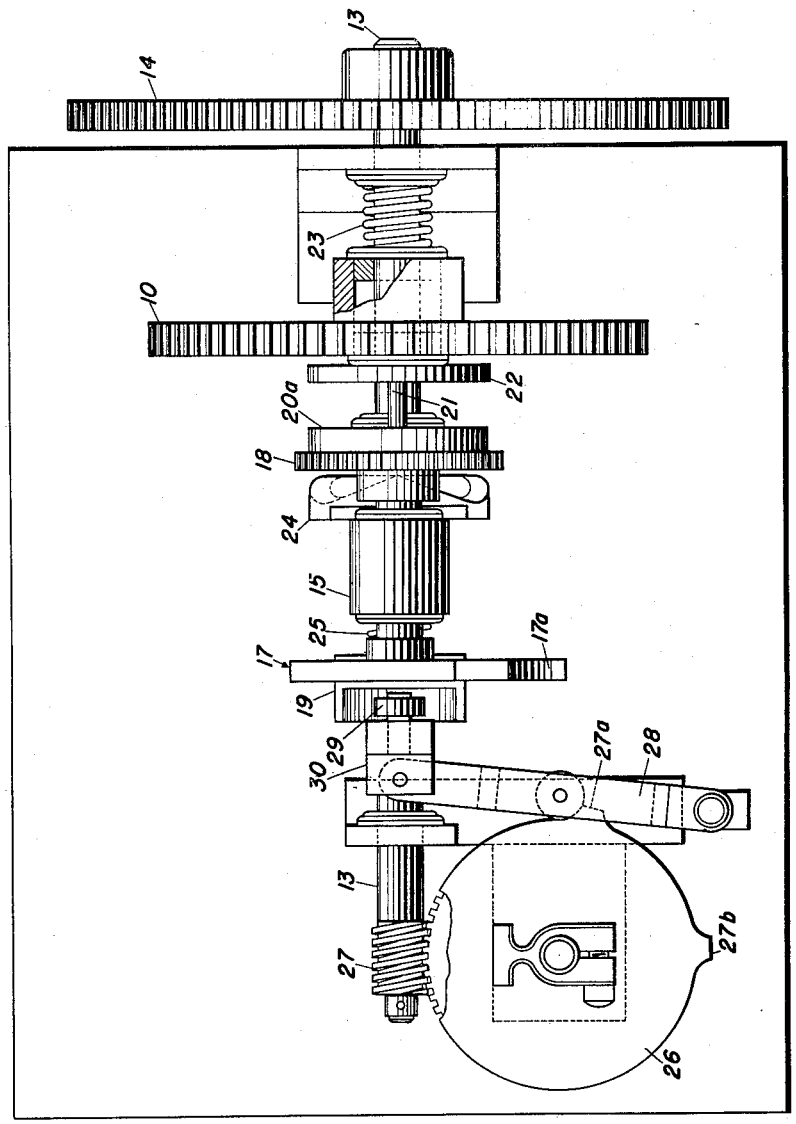

UNITED STATES PATENT OFFICE 2,691,895

DRIVE MECHANISM

John F. Blackburn, Cambridge, Mass., assignor, by mesne assignments, to the United States of America as represented by the Secretary of the Navy Application May 27, 1947, Serial No. 750,713

4 Claims. (Cl. 74—111)

This invention relates to driving mechanisms and more particularly to a novel driving mechanism of the intermittently operating type for automatically driving an output member between predetermined control limits of an input member and breaking the driving connection when the control limits are exceeded.

In fire control or gun laying systems of the type which is controlled by radar (radio detection and ranging equipment), the radar is used to track the target or to search for it at great distances, for example 50,000 yards, as well as to control the aiming of the guns. The computer for the fire control system, however, is preferably designed to operate at much smaller ranges, for example, 500 to 8,000 yards. Accordingly, it is desirable to feed information from the radar range servomotor to the computer only between these smaller limits within which the computer is designed to operate.

The drive mechanism of the present invention may be used to particular advantage for operating the computer from the radar range servomotor only between the range limits for which the computer is designed, although it will be understood that the invention is not limited to this use.

One object of the present invention resides in the provision of an intermittent drive mechanism of relatively simple construction, which is accurate and positive in operation.

Another object is to provide a mechanism of the character described which is characterized by the inclusion of a Geneva mechanism operable under control of the input member to make or break the driving connection between the input and the output members without shock.

A further object of the invention is to provide a mechanism of the character described in which the Geneva mechanism controls a device for moving the output member axially on a shaft common to the input member and the Geneva mechanism, to make and break the driving connection between the members without shock.

Figure 1:
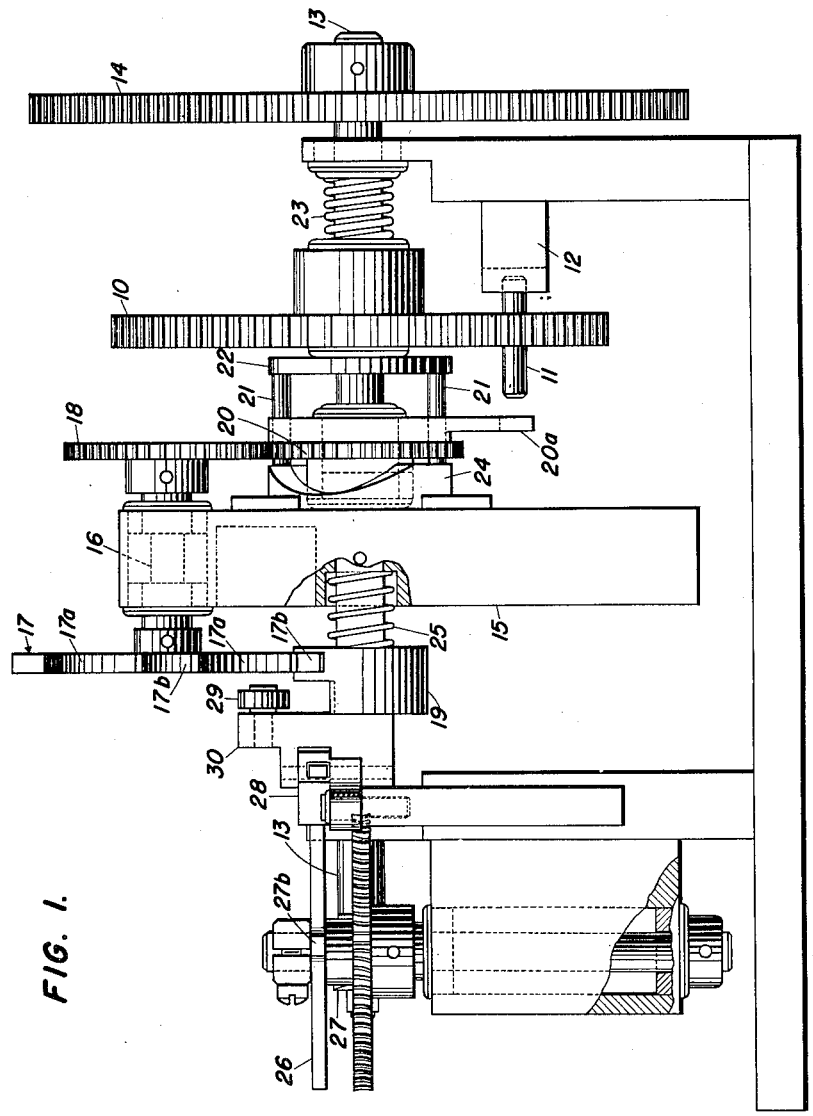
Figure 2:
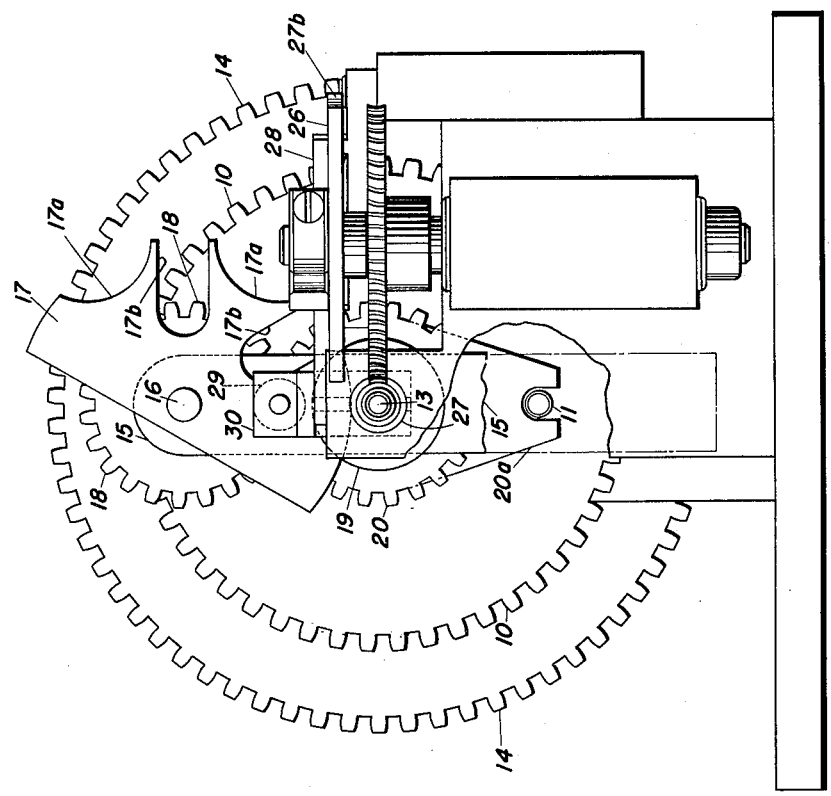

These and other objects of the invention may be better understood by reference to the accompanying drawings, in which Figure 1 is a front view of one form of the new mechanism, and Figures 2 and 3 are side and plan views, respectively, of the mechanism shown in Figure 1.

The counterweighted arm 15, Fig. 1, and the shaft 16, Geneva cam 17 and gear 18 attached to the counterweighted arm 15 rotate with the main shaft 13. The Geneva cam 17 may be engaged either with cylinder 19 or with Geneva driver 29.

When the Geneva cam 17 is engaged with the cylinder 19, shaft 16 and gear 18 are stationary in the moving counterweighted arm 15 because of the mating contact between one of the concave surfaces 17a, Fig. 2, and the surface of cylinder 19. Consequently gear 18 and moveably mounted gear 20 are in stationary contact; and pins 21, slidable in gear 20, contact the rotating cylindrical thrust cam 24, which is integral with arm 15, without any relative motion.

Pins 21 may be either at the high points of cam 24 as shown in Fig. 1 or at the low points depending on prior epicyclic motion of gear 18 around gear 20. When pins 21 are at the high points of cam 24, in Fig. 1, output gear 10 and pin 11 are held by stationary block 12. When pins 21 are at the low points of cam 24, pin 11 is allowed to engage fork 20a in order to drive the output gear 10.

The epicyclic motion of gear 18 takes place when timing cam 26, Fig. 3, causes the Geneva driver 29 to enter one of the radial slots 17b, Fig. 2, on the Geneva cam 17. The form of protuberances 27a and 27b on timing cam 26 governs the rapidity of engagement and disengagement of the Geneva driver 29 with Geneva cam 17 and also governs the duration of the driving engagement. The duration of epicyclic motion for the Geneva cam 17 and for gear 18 is just enough to move pins 21 from the high points to the low points on cam 24 or from the low points to the high points.

In the side view shown in Figure 1, the output gear 10 is not being driven at the moment since it is braked by its peg 11 fitting in the stationary block 12, and is riding or floating on the main shaft 13 driven by the input gear 14. This main shaft constantly drives the counterweighted arm 15 which carries the shaft 16 to which the Geneva cam 17 and driving gear 18 are connected, thus furnishing the epicyclic action. The Geneva cam 17, shown best in Fig. 2, has one intermediate and two opposite concave surfaces 17a and two radial notches 17b. Since the Geneva cam has one of the two opposite concave surfaces 17a (see Figure 2) slip-fitted over the cylinder 19, on the main shaft, it is free to swing in an orbit around the main shaft but cannot rotate on its own shaft 16. Likewise, the same limitations apply to gear 18. The latter thus drives gear 20, carrying with it the two pegs 21 of the adjusting yoke 22. By means of the spring 23 on the main shaft, these pegs are held firmly against the upper limits of the cylindrical thrust cam 24, which turns with the same speed as gear 20 because this cam is connected to the rotating counterweighted arm 15. During this period of operation, the movable parts, including the adjusting yoke 22 and the Geneva cam 17 and all the elements in between them, rotate as one rigid body.

In the meantime, the central shaft has been slowly driving the horizontal timing cam 26 at the end of the assembly through the agency of a worm gear 27. As shown in Figure 3, this timing cam has two protuberances 27a and 27b on its circumference, whose function is to push forward a spring 25, pressed rocker arm 28, and collar 30, and in so doing disengage the cylinder 19 from the Geneva cam 17. When this happens, the small idler or Geneva driver 29 registers with one of the radial notches 17b in the Geneva cam, causing it to rotate on its own axis, with approximately sinusoidal acceleration to a maximum velocity equal to that of the main shaft, so that at that instant gear 18 does not drive gear 20, but walks around it. The immediate result of this slowing-up of gear 20 is that the pins 21 of the adjusting yoke 22 are also slowed up and are forced by the spring 23 pushing against the output gear 10 to ride down the depression of the thrust cam 24 which continues to move. This lateral motion disengages the peg 11 that brakes the output gear 10 and causes this peg to engage the momentarily stationary fork 20a which is attached to gear 20.

Now the output gear is in position to have torque applied to it by the fork 20a. During the next half revolution or so of the main shaft 13, the timing cam 26 moves far enough to permit the rocker arm 28 to be moved back to its original position by the spring 25, putting the cylinder 19 in register with the intermediate concave surface of the Geneva arm 17 and locking it, so that once again it is prevented from rotating on its axis as it is rotated in its orbit about the main shaft 13. Gear 20 is again driven by gear 18 and sinusoidally accelerated to the speed of the main shaft during the second half of the action of the Geneva cam 17. Thus after disengagement of the Geneva driver 29 from the cam notch, the whole rotating system moves as a rigid body, as before, except that now the output gear 10 is also coupled rigidly to it through the peg 11 and fork 20a. The output gear 10 will continue rotating with the main shaft 13 as if rigidly mounted thereon until the next protuberance on timing cam 26 starts pushing rocker arm 28. Now the Geneva cam 17 is again moved about its axis by the Geneva driver 29 engaging with the other radial notch 17b as the Geneva cam 17 orbitally rotates with the main shaft 13. Simultaneously the pegs 21 are forced to the high part of the cylindrical thrust cam 24, and stay there as the high part of protuberance 27b is passed and the third concave surface of the Geneva cam is engaged with cylinder 19. Thereby, the output gear 10 is disengaged from fork 20a and pin 11 engages stationary block 12.

Because there is a period of non-linearity during the change-over, the timing cam is designed to kick in just below 500 yards and to kick out just above 7600 yards. This assures smoothness and linearity throughout the operational scale of the structure activated by gear 10. It should be understood that this mechanism operates with the range changing in either direction, with variable range rates, and with the target coming in and out of the operational range.

For the purposes of the description in this application the Geneva cam 17 is shown with three concave surfaces 17a and two radial notches 17b for cooperation with the two protuberances 27a, 27b on timing cam 26 which is limited to one revolution either way. However, more protuberances on timing cam 26 and more concave surfaces and slots on Geneva cam 17 may be provided, if several engagements and disengagements of output gear 10 are desired with main shaft 13.

I claim:

1. An intermittent driving mechanism comprising input means, epicyclic means driven by the input means, Geneva cam means responsive to orbital movement of said epicyclic means adapted during operation to intermittently impart planetary motion to said epicyclic means, output means, clutch means driven by the epicyclic means including means responsive to planetary motion thereof for alternately engaging and disengaging said epicyclic means with said output means, and control means driven by the input means periodically activating said Geneva cam means.

2. In a power driven means including a timing cam formed to provide protuberances thereon, lever means adjacent thereto for engaging with said protuberances, a drive shaft in engagement with the timing cam for driving said cam, a driving unit slidably mounted on said drive shaft, said unit comprising a projecting element and a cylindrical portion adjacent thereto Geneva cam means positioned adjacent said driving unit for alternative engagement with said projecting element and with said cylindrical portion, whereby said projecting element drives said Geneva cam means including an epicyclic gear system and a clutch unit operated by said gear system for transmitting movement from said drive shaft to a driven element.

3. In a power driven means including a timing cam formed to provide protuberances thereon, lever means adjacent thereto for engaging with said protuberances, a drive shaft in engagement with the timing cam for driving said cam, a driving unit slidably mounted on said drive shaft, said unit comprising a projecting element and a cylindrical portion adjacent thereto, Geneva cam means positioned adjacent said driving unit for alternative engagement with said projecting element and with said cylindrical portion, whereby said projecting element drives said Geneva cam means, a counterweighted arm fixed to the drive shaft, a shaft moveably mounted in said arm, a gear fixed on one end of the moveably mounted shaft, said gear and moveably mounted shaft in driving connection with the Geneva cam means, a gear moveably mounted on the drive shaft, and clutch means operated by said second gear for transmitting movement from said drive shaft to a driven element.

4. In an intermittent drive mechanism, a rotary drive shaft, a rotary driven member floating on said drive shaft, an epicyclic gear carrier fast on said drive shaft, a Geneva cam locking cylinder coaxially mounted on said drive shaft, a Geneva cam driver mounted in radially offset relation to said drive shaft, means actuated by said drive shaft for automatically periodically shifting said cylinder and driver between axially spaced positions relative to said drive shaft, a Geneva cam mounted on said carrier eccentrically of said drive shaft, said cam being provided along its periphery with angularly spaced arcuate concave surfaces adapted for sequential engagement with said cylinder upon successive shifts of said cylinder and driver into one of said axially spaced positions to cause said Geneva cam to periodically dwell, and with intervening radially notched surfaces adapted for sequential engagement with said driver upon successive shifts of said cylinder and driver into the other of said axially spaced positions to impart successive accelerating and decelerating movements to said cam between said cam dwell periods, a clutch including a driven element affixed for movement with said rotary driven member and a drive element floating on said drive shaft and axially movable between positions of engagement and disengagement with said driven element, means including a planetary gear rotatable on said epicyclic gear carrier and a sun gear rotatable on said drive shaft for transmitting orbital motion from said carrier to said drive element at an angular velocity equal to that of said drive shaft and for periodically transmitting accelerating and decelerating rotary motion from said Geneva cam to said drive element in a direction opposite that of said drive shaft whereby said drive element is periodically caused to momentarily dwell, and a clutch shift cam fast on said drive shaft for shifting said clutch alternately into and out of engagement during successive advancements of said Geneva cam, said cam being adapted to engage said clutch only at said moments of dwell of said drive element.

References Cited in the file of this patent

UNITED STATES PATENTS

| Number | Name | Date |
|---|---|---|
| 1,542,400 | Ter Meer | June 16, 1925 |
| 2,239,313 | Beschine | Apr. 22, 1941 |
| 2,535,774 | Armelin | Dec. 26, 1950 |